United States Patent [19]

Gaffal et al.

[11] 3,949,971

[45] Apr. 13, 1976

[54] PUMP CONSTRUCTION

[76] Inventors: Karl Gaffal, Breslauer-Str. 21a, 6711 Hessheim, Pfalz; Rolf Martens, Muhlstrasse 33, 6710 Frankenthal, Pfalz; Peter Havekost, Fontanestrasse, 8, Bobenheim-Roxheim 2, all of Germany

[22] Filed: May 18, 1973

[21] Appl. No.: 360,879

[30] Foreign Application Priority Data

May 20, 1972 Germany.............................2223853

[52] U.S. Cl. .......... 259/95; 259/107; 259/DIG. 16; 308/77
[51] Int. Cl.² ...................... B01F 7/22; F16C 3/16
[58] Field of Search .......................... 259/106–110, 259/95, 96, DIG. 16; 308/76, 77; 415/177

[56] References Cited
UNITED STATES PATENTS

| | | | |
|---|---|---|---|
| 1,992,447 | 2/1935 | Savy.................................... | 259/96 |
| 2,137,328 | 11/1938 | Bissell........................... | 259/DIG. 16 |
| 2,635,016 | 4/1953 | Doniak................................ | 308/77 |
| 3,022,052 | 2/1962 | Smith................... | 259/95 X |
| 3,149,819 | 9/1964 | Baumann............................ | 308/76 |

*Primary Examiner*—Harvey C. Hornsby
*Assistant Examiner*—Alan Cantor
*Attorney, Agent, or Firm*—Michael J. Striker

[57] ABSTRACT

An outer tubular member is adapted to be connected at one end with the wall of a pressure vessel, such as a reactor, and an inner tubular member is rigidly connected with and extends coaxially through the outer tubular member. A portion of the inner tubular member extends beyond the outer tubular member into the interior of the pressure vessel, and a pump shaft extends through the inner tubular member. A radial bearing for the pump shaft is located in the aforementioned portion of the inner tubular member and a pump wheel is connected with the pump shaft within the pressure vessel. A pump shaft seal is located in the inner tubular member within the confines of the outer tubular member, and arrangements are provided for sealingly connecting the inner and outer tubular members with one another, and for carrying exteriorly of the pressure vessel an additional bearing.

6 Claims, 3 Drawing Figures

1

PUMP CONSTRUCTION

BACKGROUND OF THE INVENTION

The present invention relates generally to a pump construction, and more particularly to a pump construction which is particularly suitable for use in a reactor pump.

Reactor pumps are already well known and are therefore not believed to require specific detailed descriptions. It is necessary, however, to point out that these pumps are usually arranged so as to be vertically mounted in or on the pressure vessel. The pump wheels and a radial bearing of the shaft for the pump wheels are located within the pressure vessel and the drive motor, the shaft seal and an additional radial bearing for the pump shaft are located outside the pressure vessel. Such pumps, which are for instance used in boiling-water reactors, conventionally have a radial bearing for the pump shaft and which is located adjacent the pump wheel in the interior of the pressure vessel, the bearing being a hydrostatically operating bearing. A separate water supply arrangement for supplying water under pressure to the hydrostatic bearing is required.

In this particular field it is customary to use ferritic and austenitic materials for components serving to mount the pump within and without the reactor vessel, that is components which are located either within or without the vessel. Because of the differential coefficient of thermal expansion of these materials it has been observed that deformations of the pump mounting member occur, that is deformations transversely of the longitudinal axis of the member. In addition it has been observed that due to interior pressure acting upon these pump mounting members, they tend to move skew with reference to their intended position. The result of all this is the exertion of static forces on the bearing which must be absorbed by the bearings even while the pump is not in operation. Although for various reasons the use of hot water lubricated hydrodynamic radial bearings would be advantageous in such pumps, the above difficulties have thus far prevented the use of this type of bearings. Because the pumps are operated at differential speeds, the statically loaded hydrodynamic hot water lubricated radial bearings would be subjected to very significant wear at low operating speeds, and this is not acceptable.

SUMMARY OF THE INVENTION

It is, accordingly, an object of the present invention to overcome the disadvantages of the prior art.

More particularly it is an object of the present invention to provide a pump construction which avoids the aforementioned disadvantages.

In keeping with these objects, and with others which will become apparent hereafter, one feature of the invention resides in a pump, particularly a reactor pump, having a combination comprising an outer tubular member adapted to be connected at one end with a wall of a pressure vessel, and an inner tubular member rigidly connected with and extending coaxially through the outer tubular member. The inner tubular member has a portion extending beyond the aforementioned one end and with clearance through an opening in the wall into the interior of the pressure vessel. A pump shaft extends through the inner tubular member and a radial bearing for the pump shaft is located in the aforementioned portion of the inner tubular member. A pump wheel is connected with the pump shaft at the portion of the inner tubular member mentioned above, and a pump shaft seal is located in the inner tubular member but within the confines of the outer tubular member. Finally, means are provided for sealingly connecting the tubular members, and also for supporting an additional pump shaft bearing, both outside the pressure vessel.

The inner and outer tubular members, that is the tubular member for the pump shaft and the tubular member which serves to mount the pump to the wall of the pressure vessel, thus are a unitary assembly which seals the opening in the reactor vessel wall, and of which the inner tubular member extends in self-supporting relationship through the opening in the reactor vessel wall, but without any contact therewith. With this construction the longitudinal center axes of the rotating and stationary components, including the shaft seal, will remain fixed in all operating conditions, both with respect to their relative positioning and to their positioning with reference to the opening in the reactor vessel wall. To the extent that any deformations occur in the outer tubular member, and some may be permissible, static radial forces can no longer be exerted upon the radial pump shaft bearing.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 51 is a somewhat diagrammatic fragmentary section showing the salient details of a pump construction according to the present invention, mounted in a wall of a reactor vessel;

DESCRIPTION OF THE PREFERRED EMBODIMENTS

Figure 1:
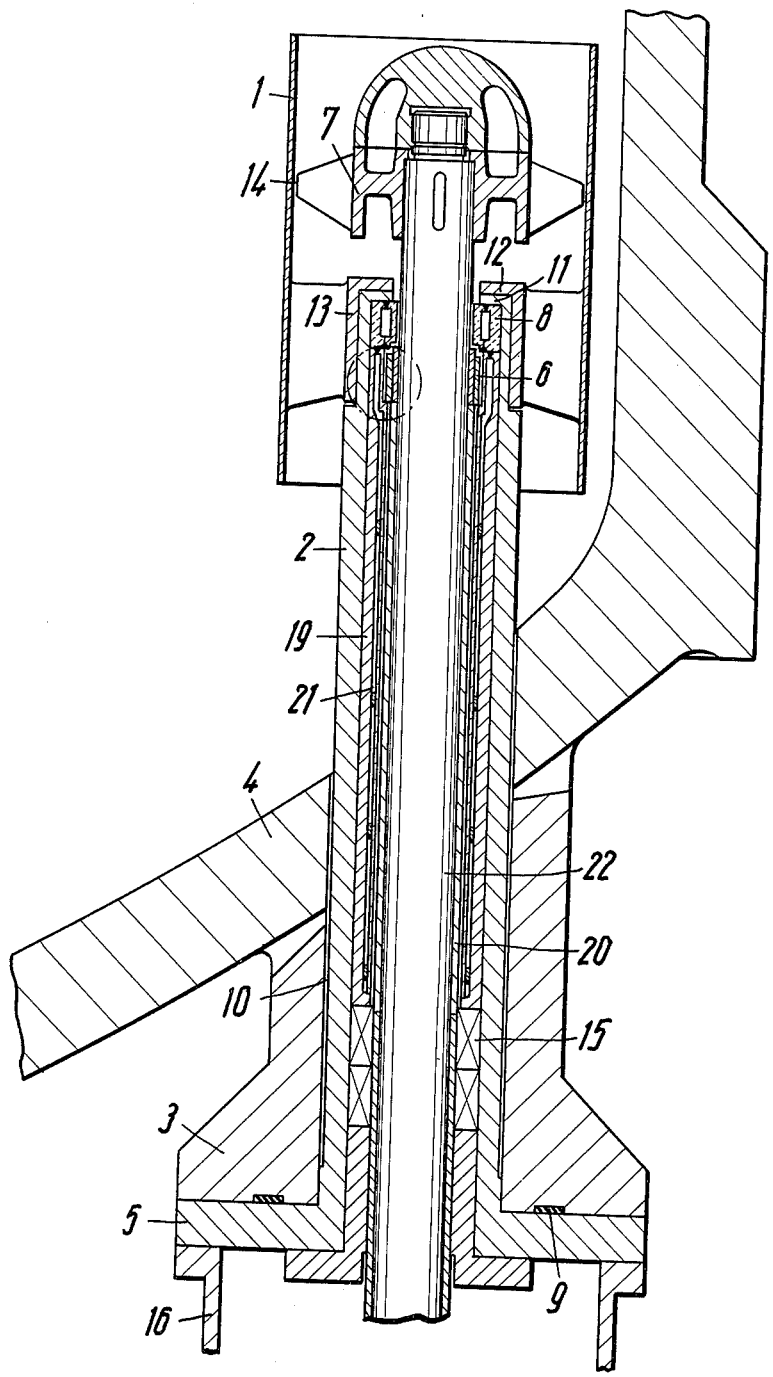

Referring to the drawing now in particular it is pointed out that this construction differs significantly from the known prior-art constructions. In the prior art the tubular member which carries the shaft bearing and the pump wheel are configurated as a unit with a pump mounting tube, that is the tubular member is welded to this tube. The tube itself extends into the pressure vessel and the only manner in which the construction can be removed for service or replacement, or even for inspection, is by having access to the interior of the pressure vessel. Evidently, this is highly undesirable.

In contradistinction thereto, the present invention provides an inner tubular member 2 which is separate from the pump wheel 1, so that the tubular member can act as a carrier for the pump wheel. Due to the tubular configuration of the member 2, the latter of course has substantial rigidty and resistance to deformation. With this construction it is possible to insert the tubular member 2 into the reactor vessel through an opening in the wall 4 thereof, from below, and also to remove it in the same direction so that access to the interior of the vessel is not necessary. Furthermore, this of course makes it possible to omit the mounting tube which is required in the prior-art constructions and which extends into the interior of the pressure vessel. An outer tubular member 3 surrounds that portion of the inner tubular member 2 which is located exteriorly of the wall 4 of the pressure vessel, and is secured in suitable manner to the wall 4, as by welding. The inner tubular member extends through the outer tubular member 3 and is connected therewith as will be discussed subsequently. The cylindrical portion of the outer tubular member 3 can be constructed as a heat shield portion, and an additional heat shield arrangement 8 can be provided intermediate an upper radial bearing 6 for the pump shaft 22, and the impeller 7, in connection with a mounting sleeve 19. In fact, the mounting sleeves 19 and 20 can be used not only for retaining the radial bearing 6 against the axial movement, but also for heat shielding purposes.

The pump wheel 1, or guide baffle as it may also be called, is not welded to the outer tubular member 2 as would be the case in the prior-art constructions, but instead is connected with the inner tubular member 2 in such a manner that it is only necessary to disengage the two from inside the reactor vessel, but disassembly can be carried out from the exterior of the reactor vessel after the radial bearing has been removed from the exterior, so that access can be had from the exterior to the connection between the baffle or pump wheel 1 and the inner tubular member 2, which is of course a simpler arrangement because the distance from the outside of the wall 4 to the connection between the components 1 and 2 is much shorter than the distance from an inlet of the reactor vessel to these components.

The tubular members 2 and 3 are connected with one another in the manner shown in FIG. 1. In particular, the tubular member 2 has a flange 5 which is so-dimensioned that it can engage a correspondingly configurated flange of the tubular member 3. It will be seen that a large contact surface is provided by the appropriate dimensioning of these flanges, making for a construction of great stability. A sealing element 9 of suitable known construction is provided between the flanges of the member 2 and 3, and seals the interior of the reactor vessel with respect to the ambient atmosphere. The flanges of the tubular members 2 and 3 can be welded together or they can be screw threaded together. If they are screw threaded together, then the annular seal 9 will be located inwardly of the screw threads provided for this purpose.

When the members 2 and 3 are connected with one another in this manner, the member 2 in conjunction with the large and stiff flange 5 acts as a pump support of great rigidity and bending resistance. A gap 10 is defined between the outside of the inner tubular member 2 and the inside of the outer tubular member 3, and also the wall bounding the opening in the vessel wall 4 through which a portion of the tubular member 2 extends into the interior of the vessel. Thus, there is no contact between the inner tubular member 2 and the wall 4, and if a deformation of the outer tubular member 3 should occur in a sense causing its longitudinal axis to tilt slightly from its normal position of coaxiality with the opening in the wall 4, no forces can be transmitted to and act upon the inner tubular member 2. Of course, if the flange 5 is welded to the flange of the outer tubular member 3, rather than being screw threaded thereto, the seal 9 can be omitted and the flange 5 then primarily serves to engage the flange of the outer tubular member 3. In either case, whether there is a screw threaded connection or a welded connection between the flanges, the flange 5 carries a socket construction 16 in which an additional bearing for the pump shaft 22 can be located.

Figure 2:
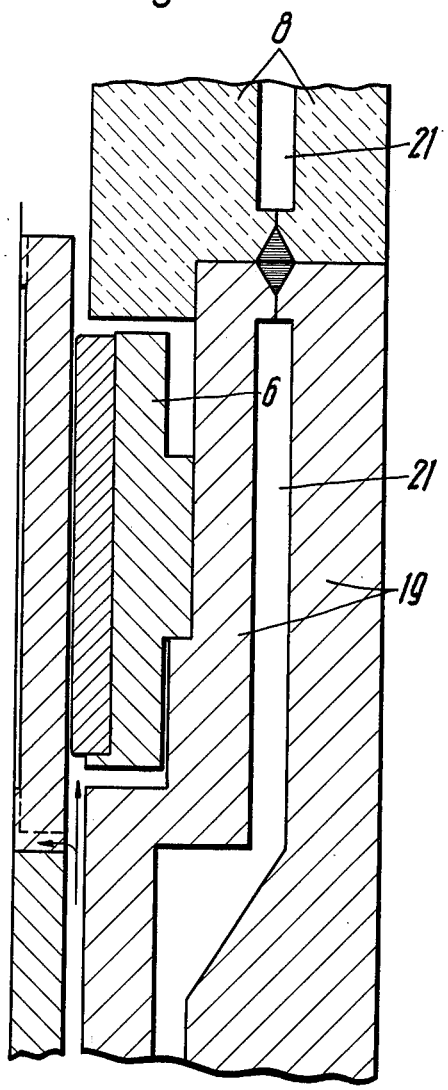
FIG. 2 is a fragmentary section, showing a detail of FIG. 1 on an enlarged scale.

Located within the reactor vessel, at the inner end portion of the inner tubular member 2, is the hydrodynamically acting radial bearing 6, which is so arranged that it can be installed and removed from below, that is from the outside of the vessel. FIGS. 1 and 2 show that the tubular member 2 is provided at its inner end, which is the upper end because the construction is mounted in upright orientation, with an inner circumferential flange 11, accommodating a threaded connection by means of which the baffle 1 is mounted on the tubular member 2, and which can be released from below, that is from the exterior of the pressure vessel. The hub of the baffle 1 is provided with a similar inwardly extending flange 12 which overlies the end face of the member 2 and thus makes possible the releasable connection between them. The cylindrical hub portion 13 of the baffle 1 is centered on the exterior of the inner tubular member 2, and the radial bearing 6 is centered in the interior of the same. This means that in all operating conditions the gap 14 between the rotating impellar 7 and the baffle 1 will be maintained without changes.

In order to increase the bearing support forces in a hot water operated bearing, the tubular member 2 or the sleeve 19 can be constructed as heat shields, and an additional heat shield arrangement 8 can be provided intermediate the impeller 7 and the radial bearing 6, thereby making it possible — in conjunction with the cooler circulating blocking water whose excess flow is passed through the radial bearing 6 in the manner still to be described—to operate the bearing in a lower temperature range than would otherwise be possible. The flow of heat from the surrounding medium into the tubular member 2, and from there into the cooling medium which flows along the pump shaft 22, can be reduced by appropriate means, that is heat shields such as evacuated hollow sleeves or other known heat shield arrangements. Such as an evacuated sleeve will then at the same time perform the function of the sleeve 19, that is it will act as a heat shield and as a spacer. The evacuated gap 21 of such a sleeve (see FIG. 2) surrounds the uppermost bearing 6 (the one within the pressure vessel) so that the temperature of the interior portion of the evacuated sleeve can be maintained at the same low level as the temperature of the bearing. As a result the play between the bearing and the interior of the sleeve 19 will be constant in all operating conditions, assuming that the materials for these components are appropiately selected. The flow of heat through the pump shaft 22 can be dammed by the circulation of the cooling medium for the bearing through the sleeve 20 which surrounds the shaft 22 with slight spacing. The cooling medium is passed through the bearing 6 in such a manner that a partial flow of the cooling medium passes through the bearing gap and a partial flow passes between the pump shaft 22 and the specially constructed rotating bearing sleeve.

Figure 3:
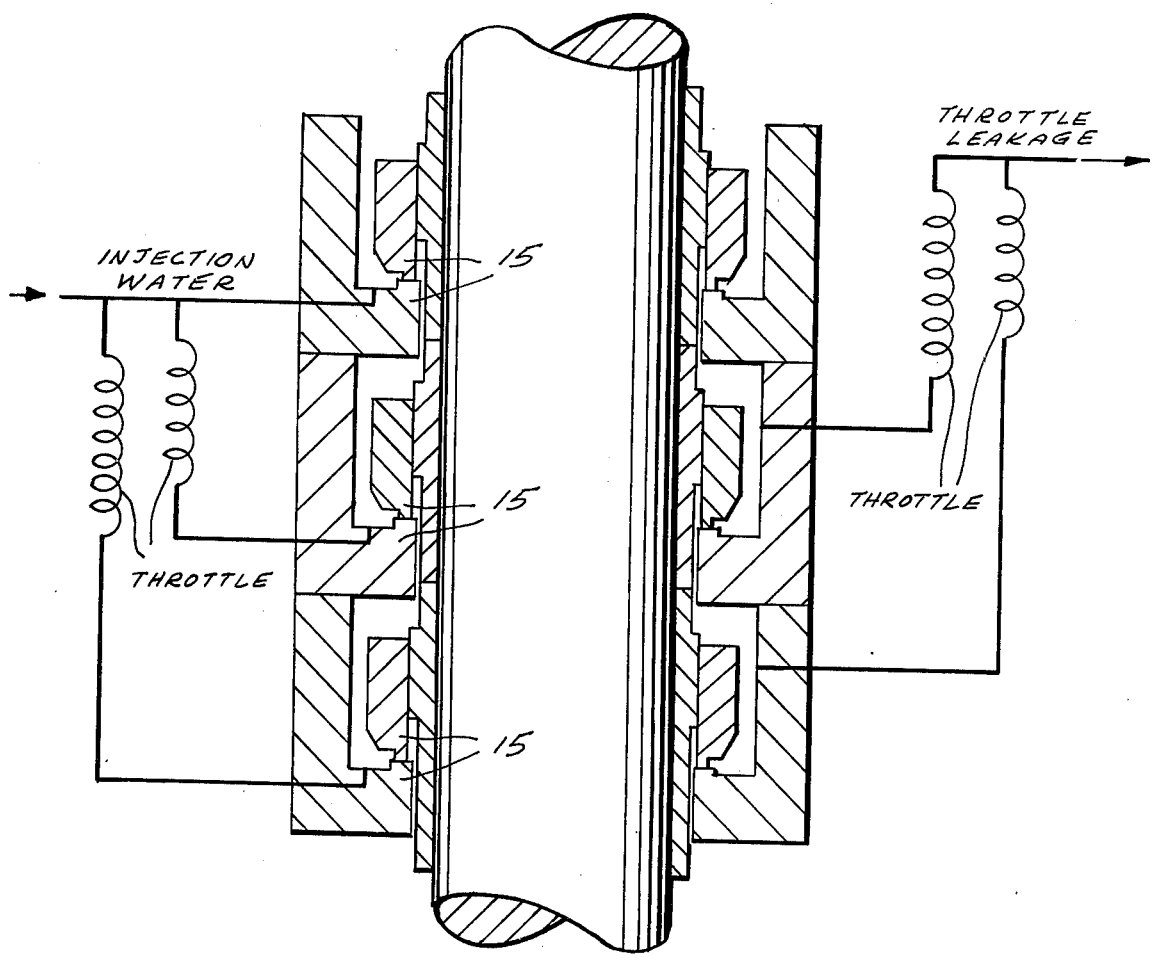
FIG. 3 is another enlarged-scale fragmentary section, showing the supply and removal of cooling fluid in the FIG. 1 pump construction.

The shaft seal 15, mounted as shown in FIG. 1, may utilize a single or several associated known mechanical sealing elements which are arranged one behind the other. The cooling and pressure distribution can be carried out according to what is known from the prior art, for instance as described in German Pat. No. 1,800,254 or when for any reason this is not possible, it can be carried out by supplying each sealing stage of the seal with cool blocking water which has been reduced to the necessary sealing chamber pressue. In the latter case the blocking water supply, which communicates with the pump at the high pressure side upstream of the first seal, is branched off (as shown in the self-explanatory FIG. 3) with a number of branches corresponding to the number of sealing stages and each provided with an appropriate throttling device. In addition, a backflow branch is provided, also having a throttle, for decreasing the sealing chamber pressure, for instance down to atmospheric pressure. The throttling devices can be arranged within the seal in such a manner that the sealing chambers will vent automatically. The partial stream for cooling of the bearing is branched off upstream of the first seal.

It will be understood that each of the elements described above, or two or more together, may also find a useful application in other types of constructions differing from the types described above.

While the invention has been illustrated and described as embodied in a pump construction it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. In a pump, particularly a reactor pump, a combination comprising an outer tubular member adapted to be connected at one end with a wall of a pressure vessel; an inner tubular member rigidly connected with and extending coaxially through said outer tubular member, said inner tubular member having a portion extending beyond said one end and with clearance through an opening in said wall into the interior of said pressure vessel and having an end portion therein; a pump shaft extending through said inner tubular member; a radial bearing for said pump shaft located in said portion of said inner tubular member; a tubular baffle releasably connected with said end portion of said inner tubular member coaxially with the latter; an impeller connected with said pump shaft and mounted thereon for rotation within said tubular baffle; a pump shaft seal in said inner tubular member within the confines of said outer tubular member; and means for sealingly connecting said tubular members, and for supporting an additional pump shaft bearing, both outside said pressure vessel.

2. A combination as defined in claim 1; and further comprising heat-shield means for shielding said shaft against heat from said vessel.

3. A combination as defined in claim 2, wherein said heat-shield means comprises a heat shield intermediate said radial bearing and said portion of said inner tubular member.

4. A combination as defined in claim 1, wherein said means comprises cooperating flanges on said inner and outer tubular members, respectively.

5. A combination as defined in claim 1; and further comprising a sleeve surrounding said shaft with slight spacing within said inner tubular member.

6. A combination as defined in claim 1, wherein said pump shaft seal comprises at least one mechanical seal, supply means for supplying cooling fluid to said seal, and removing means for removing spent cooling fluid from said seal.

* * * * *